(12) United States Patent
Liou et al.

(10) Patent No.: US 11,309,980 B2
(45) Date of Patent: Apr. 19, 2022

(54) SYSTEM FOR SYNTHESIZING SIGNAL OF USER EQUIPMENT AND METHOD THEREOF

(71) Applicant: National Chiao Tung University, Hsinchu (TW)

(72) Inventors: En Cheng Liou, Hsinchu (TW); Ta-Sung Lee, Hsinchu (TW); Chia-Hung Lin, Tainan (TW); Yu-Chien Lin, New Taipei (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 95 days.

(21) Appl. No.: 17/028,786

(22) Filed: Sep. 22, 2020

(65) Prior Publication Data

US 2021/0399816 A1 Dec. 23, 2021

(30) Foreign Application Priority Data

Jun. 18, 2020 (TW) ................................ 109120574

(51) Int. Cl.
*H04B 17/391* (2015.01)
*H04W 24/06* (2009.01)
*H04W 24/10* (2009.01)

(52) U.S. Cl.
CPC ..... *H04B 17/3912* (2015.01); *H04B 17/3913* (2015.01); *H04W 24/06* (2013.01); *H04W 24/10* (2013.01)

(58) Field of Classification Search
CPC ... H04W 24/00; H04W 16/02; H04W 64/003; H04W 24/06; H04W 24/10; H04W 16/18;
(Continued)

(56) References Cited

U.S. PATENT DOCUMENTS

| 7,277,395 B2 | 10/2007 | Rosen et al. |
| 9,686,702 B2 | 6/2017 | Beyme |

(Continued)

FOREIGN PATENT DOCUMENTS

| EP | 2 997 679 B1 | 8/2018 | |
| EP | 3447506 A1 * | 2/2019 | ............... G06N 3/04 |

(Continued)

OTHER PUBLICATIONS

Attaby et al., "Wipi: A Low-Cost Large-Scale Remotely-Accessible Network Testbed", IEEE Access, 2019, vol. 7, pp. 167795-167814.

(Continued)

*Primary Examiner* — Lana N Le
(74) *Attorney, Agent, or Firm* — Birch, Stewart, Kolasch & Birch, LLP (57) ABSTRACT

A system for synthesizing signal of user equipment and a method thereof are provided. The system includes a physical channel modeler and a physical channel training module. The physical channel modeler receives geo information of a field under test of and a sparse real physical field channel feature to build a physical channel model. The physical channel modeler estimates a plurality of predefined positions of the geo information to obtain a plurality of simulated physical field channel features corresponding to the predefined positions. The physical channel training module receives and performs training on the geo information, the sparse real physical field channel feature and the simulated physical field channel features by using an AI algorithm to perform an inference of a fully real physical field channel feature.

11 Claims, 5 Drawing Sheets

(58) Field of Classification Search
CPC .. H04B 17/00; H04B 17/391; H04B 17/3912; H04B 17/309; H04B 17/0085; H04B 17/0087; H04B 17/29; H04B 17/3913; H04B 17/373; H04B 17/27
See application file for complete search history.

(56) References Cited

U.S. PATENT DOCUMENTS

| | | | | |
|---|---|---|---|---|
| 10,356,597 | B2* | 7/2019 | Prasad | H04L 41/0803 |
| 10,841,025 | B2* | 11/2020 | Hammond | H04B 17/3912 |
| 11,032,014 | B2* | 6/2021 | O'Shea | H04B 17/373 |
| 2010/0075678 | A1* | 3/2010 | Akman | H04L 43/50 455/67.11 |
| 2011/0103504 | A1 | 5/2011 | Ma | |
| 2013/0099985 | A1* | 4/2013 | Gross | H04B 17/21 343/703 |
| 2014/0341052 | A1* | 11/2014 | Devarasetty | H04W 24/08 370/252 |
| 2019/0182702 | A1* | 6/2019 | Wang | H04W 28/0221 |
| 2021/0298038 | A1* | 9/2021 | Kang | H04B 7/06 |
| 2021/0337412 | A1* | 10/2021 | Zhu | H04W 28/04 |
| 2021/0352692 | A1* | 11/2021 | Lei | H04W 52/0216 |

FOREIGN PATENT DOCUMENTS

| | | | | |
|---|---|---|---|---|
| WO | WO-2020068614 | A1 * | 4/2020 | H04B 17/3912 |
| WO | WO-2021050396 | A1 * | 3/2021 | G06N 3/04 |
| WO | WO-2021201491 | A1 * | 10/2021 | |

OTHER PUBLICATIONS

Borries et al., "FPGA-Based Channel Simulator for a Wireless Network Emulator", IEEE 69th Vehicular Technology Conference, Apr. 26-29, 2009, total 5 pages.

Ji et al., "Wideband Radio Channel Emulation Using Band-stitching Schemes", European Conference on Antennas and Propagation (EuCAP), 2020, total 6 pages.

Rodrigues et al., "On Real Time Optical Wireless Communication Channel Emulator Design with FPGAs", 1st West Asian Coloquium on Optical Wireless Communications (WACOWC2018), Isfahan, Iran, Apr. 2018, total 6 pages.

* cited by examiner

SYSTEM FOR SYNTHESIZING SIGNAL OF USER EQUIPMENT AND METHOD THEREOF

This application claims priority for Taiwan patent application no. 109120574 filed on 18 Jun. 2020, the content of which is incorporated by reference in its entirely.

BACKGROUND OF THE INVENTION

Field of the Invention

The present invention relates to a system for synthesizing signal and a method thereof, and more particularly to a system for synthesizing signal of user equipment and a method thereof.

Description of the Prior Art

Generally, a base station equipment supplier can use two existing methods to test the function and performance of a base station for each geographic location in a physical field under test. One method is to use a large number of terminal devices to perform measurement or use a single device to continuously perform point-by-point measurement, thereby obtaining a fully real physical field channel feature; however, the former causes waste of measurement devices and manpower, and the latter causes waste of measurement time and manpower. Besides, the measurement results may also outdate or inaccurate because of environmental changes in facilities, climate, temperature in the physical field, and it therefore causes re-measuring requirement and failure of estimation or update.

The other method is to use a physical channel modeler to build channel model of the physical field under test, so as to obtain simulated physical field channel features. However, this method builds the channel model under the assumption of an ideal state, and the simulation result may also be significantly inaccurate on the premise of excluding all imperfections.

SUMMARY OF THE INVENTION

An objective of the present invention is to provide a system for synthesizing signal of user equipment and a method thereof, so as to quickly provide a simulation result with high accuracy.

In order to achieve the objective, the present invention provides a physical channel modeler and a physical channel training module. The physical channel modeler is configured to receive geographic information of a field under test and a sparse real physical field channel feature, to build a physical channel model and estimate a plurality of predefined positions of the geographic information by using the physical channel model, to obtain a plurality of simulated physical field channel features corresponding to the plurality of predefined positions. The sparse real physical field channel feature includes a plurality of real physical field channel features measured at a plurality of measure positions of the geographic information, respectively. The physical channel training module is connected to the physical channel modeler, and configured to receive the geographic information, the sparse real physical field channel feature and the simulated physical field channel feature, and perform training on the geographic information, the sparse real physical field channel feature and the simulated physical field channel feature by using an artificial intelligence (AI) algorithm, to perform an inference of fully real physical field channel feature covering the plurality of predefined positions and the plurality of measure positions.

According to an embodiment of the present invention, the system further includes a plurality of emulator units disposed at the plurality of measure positions in the field under test and connected to a telecommunication system under test. The plurality of emulator units transmit signals to and receive signals from the telecommunication system under test, so as to provide the sparse real physical field channel feature to the physical channel modeler.

According to an embodiment of the present invention, the system further includes a geographic information fetch unit connected to the physical channel modeler and configured to fetch the geographic information and provide the geographic information to the physical channel modeler.

According to an embodiment of the present invention, the geographic information fetch unit is a lidar configured to scan the field under test, to obtain geographic information.

According to an embodiment of the present invention, the system further includes a control unit and a virtual user equipment scheduler. The control unit is connected to the physical channel modeler, the physical channel training module and the virtual user equipment scheduler, and configured to control at least one of operations of starting, ending and executing predefined processes or steps, and requesting report data, and allocate the number and positions of the plurality of virtual UEs required in the field under test. The virtual user equipment scheduler is configured to assign or modify dispatch, schedule, management and information of the resource blocks of the plurality virtual UEs based on the fully real physical field channel feature.

According to an embodiment of the present invention, the physical channel training module includes a generator and a discriminator. The generator is configured to perform an inference of the fully real physical field channel feature by using the artificial intelligence (AI) algorithm. The discriminator is configured to judge reality of the fully real physical field channel feature, which is generated by the generator, by using another artificial intelligence (AI) algorithm, and perform adversarial training on the generator and the discriminator until the Nash Equilibrium is achieved.

According to an embodiment of the present invention, the artificial intelligence (AI) algorithm is a convolution-neural-network(CNN)-based Algorithm.

In order to achieve the objective, the present invention provides a method for synthesizing signal of user equipment (UE), and the method includes steps of: receiving geographic information of a field under test and a sparse real physical field channel feature to build a physical channel model; estimating a plurality of predefined positions of the geographic information by using the physical channel model, to obtain a plurality of simulated physical field channel features corresponding to the plurality of predefined positions; receiving the geographic information, the sparse real physical field channel feature and the simulated physical field channel features, and performing training on the geographic information, the sparse real physical field channel feature and the simulated physical field channel features by using an artificial intelligence (AI) algorithm, to perform an inference of a fully real physical field channel feature covering the plurality of predefined positions and the plurality of measure positions. The sparse real physical field channel feature includes a plurality of real physical field channel features measured at a plurality of measure positions of the geographic information, respectively.

According to an embodiment of the present invention, the step of performing the inference of the fully real physical field channel feature, further includes the following substeps of: performing the inference of the fully real physical field channel feature by using the artificial intelligence (AI) algorithm; judging reality of the fully real physical field channel feature, which is generated by the generator, by using another artificial intelligence (AI) algorithm, and performing adversarial training on the generator and the discriminator until the Nash Equilibrium is achieved.

According to an embodiment of the present invention, the method further includes steps of: allocating number and positions of the plurality of virtual UEs required in the field under test; and assigning or modifying dispatch, schedule, management and information of resource blocks of the plurality of virtual UEs based on the fully real physical field channel feature.

According to aforementioned content, the system and the method of the embodiment of the present invention can just measure the real physical field channel features at fewer positions and then perform the inference of the fully real physical field channel feature by using the artificial intelligence (AI) algorithm, to quickly provide the simulation result with high accuracy.

DESCRIPTION OF THE PREFERRED EMBODIMENTS

Figure 1:
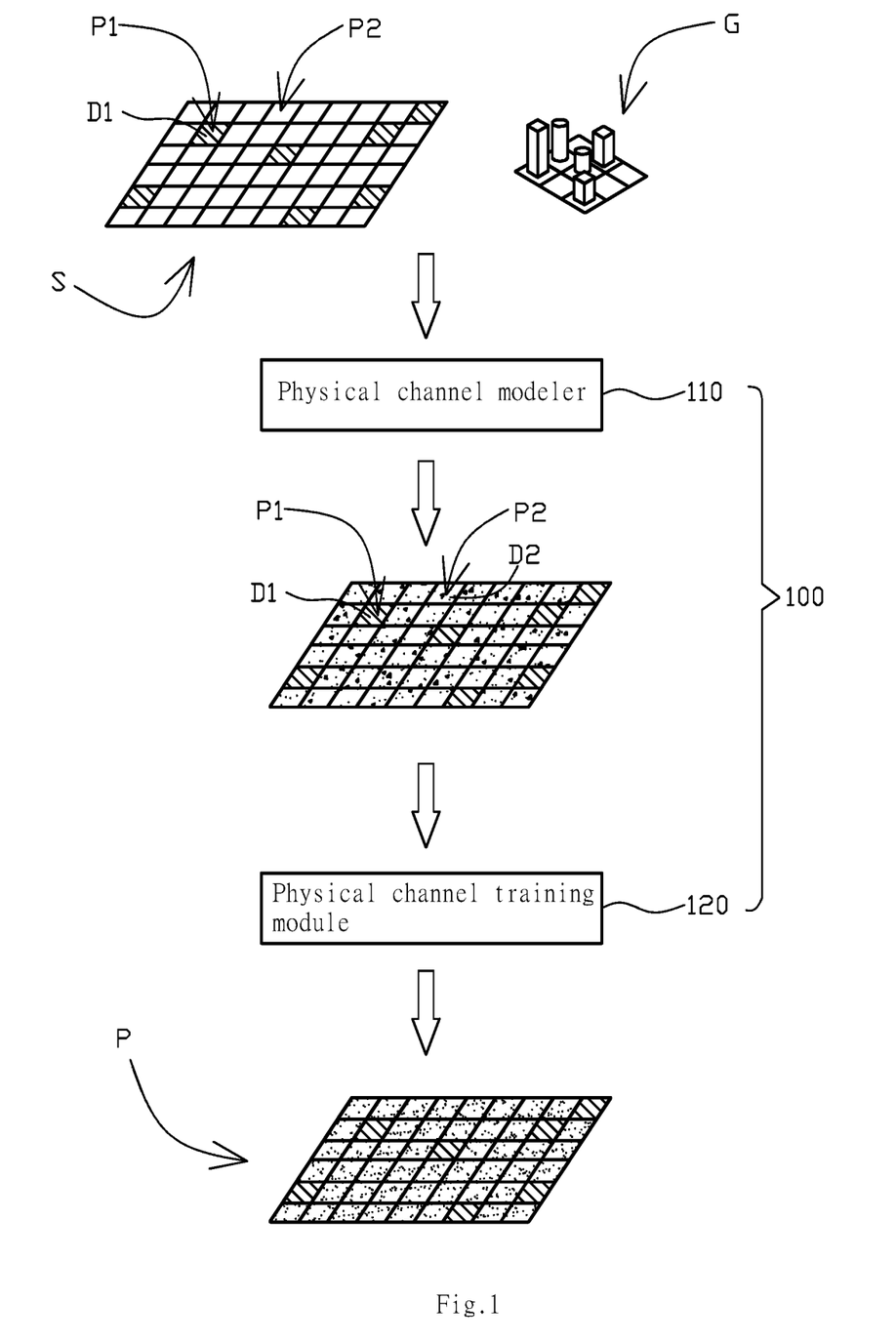
FIG. 1 is a conceptual diagram of a system for synthesizing signal of user equipment, according to an embodiment of the present invention.
Figure 2:
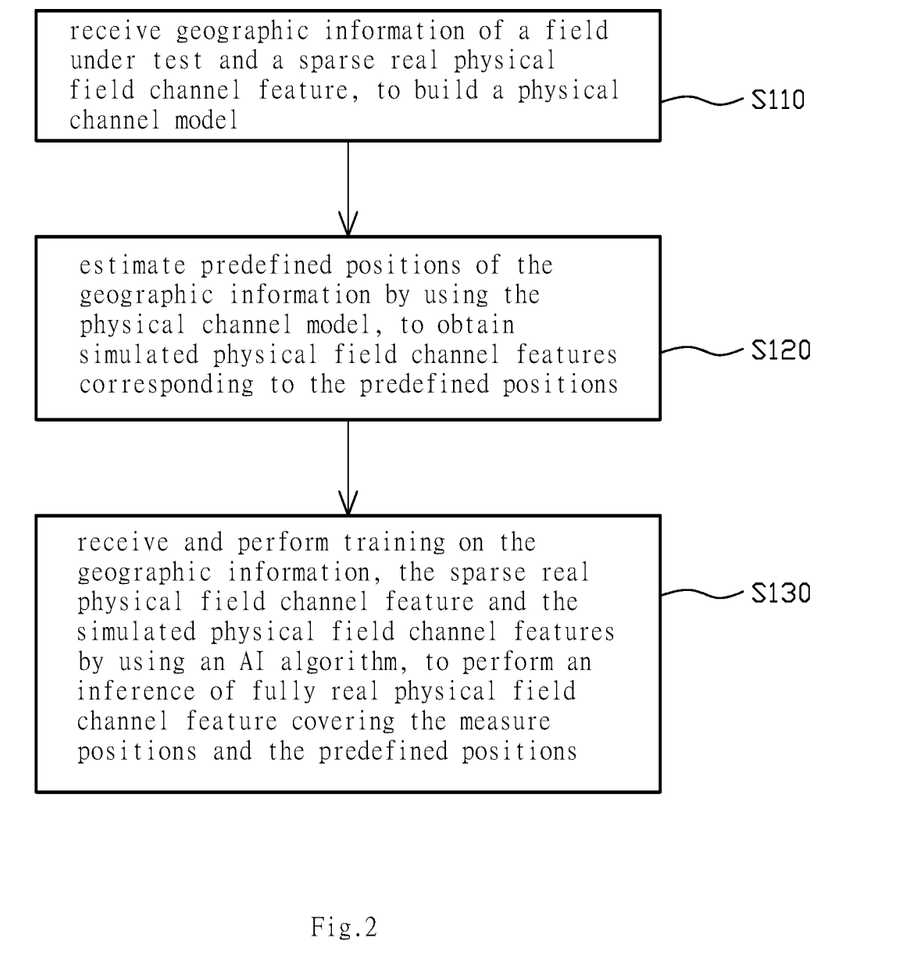
FIG. 2 is a flowchart of a method for synthesizing signal of user equipment, by applying the system of FIG. 1.

FIG. 1 is a conceptual diagram of a system for synthesizing signal of user equipment, according to an embodiment of the present invention, and FIG. 2 is a flowchart of a method for synthesizing signal of user equipment, by using the system of FIG. 1. Please refer to FIGS. 1 and 2. A system 100 for synthesizing signal of user equipment includes a physical channel modeler 110 and a physical channel training module 120. First, in a step S110, the physical channel modeler 110 receives geographic information G of a field under test (not shown in figures) and a sparse real physical field channel feature S, to build a physical channel model (not shown in figures). In this embodiment, the sparse real physical field channel feature S includes a plurality of real physical field channel features D1 measured at a plurality of measure positions P1 of the geographic information G, respectively.

Next, in a step S120, the physical channel modeler 110 estimates a plurality of predefined positions P2 of the geographic information G by using the physical channel model, to obtain a plurality of simulated physical field channel features D2 corresponding to the plurality of predefined positions P2. In this embodiment, for example, the physical channel model can be implemented in consideration of a geographic location relationship of the plurality of predefined positions P2 and the plurality of measure positions P1 only and in cooperation with a linear interpolation method, so as to estimate the simulated physical field channel features D2. Next, in a step S130, the physical channel training module 120 receives and performs training on the geographic information G, the sparse real physical field channel feature S and the plurality of simulated physical field channel features D2 by using an artificial intelligence (AI) algorithm, to perform an inference of fully real physical field channel feature P covering the plurality of measure positions P1 and the plurality of predefined positions P2. In this embodiment, for example, the artificial intelligence (AI) can be a convolution-neural-network (CNN)-based algorithm; the physical channel training module 120 can include, but not limited to, software, hardware or other known algorithm capable of assisting machine learning, artificial intelligence, deep learning, neural network, or equivalent algorithm, mathematical or manual judgement method capable of completing the same task target.

It is worth noting that this embodiment can perform the inference of the fully real physical field channel feature P by using the artificial intelligence (AI) algorithm and based on the real physical field channel features D1 measured at the few measure positions P1 Therefore, this embodiment can quickly provide the simulation result with high accuracy. More particularly, during the training process, besides considering the geographic location relationship of the predefined positions P2 and the measure positions P1, other environment condition can be also considered, for example, whether an obstacle exists at any one of the predefined positions P2 and the measure positions P1. Therefore, the inferred fully real physical field channel feature P can be in line with reality.

Figure 3:
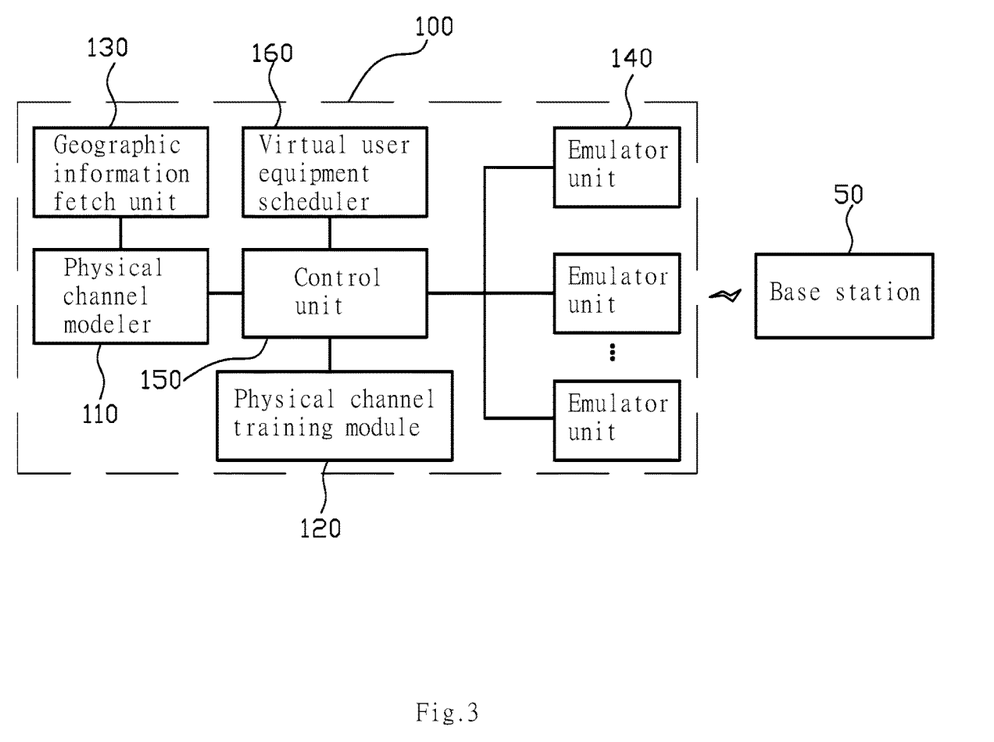
FIG. 3 is a detailed block diagram of the system of FIG. 1.

FIG. 3 is a detailed block diagram of the system of FIG. 1. Please refer to FIGS. 1 and 3. The system 100 for synthesizing signal of user equipment includes a geographic information fetch unit 130, a plurality of emulator units 140, a control unit 150, and a virtual user equipment scheduler 160. The geographic information fetch unit 130 is connected to the physical channel modeler 110 and configured to scan the field under test, so as to fetch the geographic information G and provide the geographic information G to the physical channel modeler 110. In an embodiment, the emulator unit 140 is a hardware device capable of transmitting a wireless signal; for example, the emulator unit 140 may be a universal software radio peripheral (USRP), an LTE/5G modem with antenna, or other hardware device capable of providing the same function. In an embodiment, the geographic information fetch unit 130 is a hardware device for providing geographic information, for example, the geographic information fetch unit 130 may be a lidar or other device capable of providing equivalent geographic information. For example, in another embodiment not illustrated in figures, the system 100 for synthesizing signal of user equipment can include a geographic database, and the geographic information fetch unit 130 is linked to the geographic database to obtain the geographic information G from the geographic database; that is, besides using the lidar or other device capable of providing equivalent geographic information, the geographic information fetch unit 130 can also directly access the geographic information G stored in the geographic database, so as to save time of measuring the geographic information G every time, thereby providing more flexibility in use.

The control unit 150 is connected to the physical channel modeler 110, the physical channel training module 120, and the virtual user equipment scheduler 160, and configured to control one of operations of starting, ending or executing specified process or step, or requesting report data; that is, the physical channel training module 120 can be connected to the physical channel modeler 110 through the control unit 150; in another illustrated embodiment, the physical channel training module 120 can also be connected to the physical channel modeler 110. The control unit 150 can allocate the number and the position of the plurality of virtual UEs (not shown in figures) required for the field under test. The virtual user equipment scheduler 160 can assign or modify dispatch, schedule, management and information of the resource blocks of the plurality of virtual UEs based on the fully real physical field channel feature P.

In this embodiment, the physical channel modeler 110, the physical channel training module 120, the control unit 150 and the virtual user equipment scheduler 160 can be implemented by, but not limited to, software or hardware manner such as electronic device or computer. The plurality of emulator units 140 are disposed at the plurality of measure positions P1 in the field under test and linked to a telecommunication system under test. The plurality of emulator units 140 can transmit signal to and receive signal from the telecommunication system under test, and provide a sparse real physical field channel feature S to the physical channel modeler 110. In this embodiment, the telecommunication system under test can be a base station 50.

In detail, for a given physical field under test, a feature collection stage can be performed first. The user can dispose K emulator units 140 at the plurality of measure positions P1 within the field under test, and dispose the base station 50 under test at the position under test. Next, the emulator units 140 can be automatically linked to the base station 50 to start communication. According to the specification of 4G\5G standard, the user can fetch a plurality of real physical field channel features D1 based on the downlink transmission frames transmitted back from the base station 50 to the emulator units 140. In this embodiment, for example, the real physical field channel features D1 can include channel state indicator (CSI) or information defined in 4G\5G specification.

In consideration of sparseness of the few emulator units 140 within the physical field under test, the user can obtain sparse real physical field channel feature S and then use the geographic information fetch unit 130 in cooperation with the physical channel modeler 110 to obtain the simulated physical field channel features D2. It should be noted that the system of the present invention can have flexibility and the user can determine the resolution of the channel features of the field under test according to application requirement; that is, the user can determine an interval distance between any two report locations. After the resolution is determined, the geographic information fetch unit 130 can be in cooperation with the physical channel modeler 110 to obtain the simulated physical field channel features D2 with the resolution. Next, after the operation of the AI-assisted simulation stage of the physical channel training module 120, the fully real physical field channel feature P with the resolution can be obtained.

Figure 4:
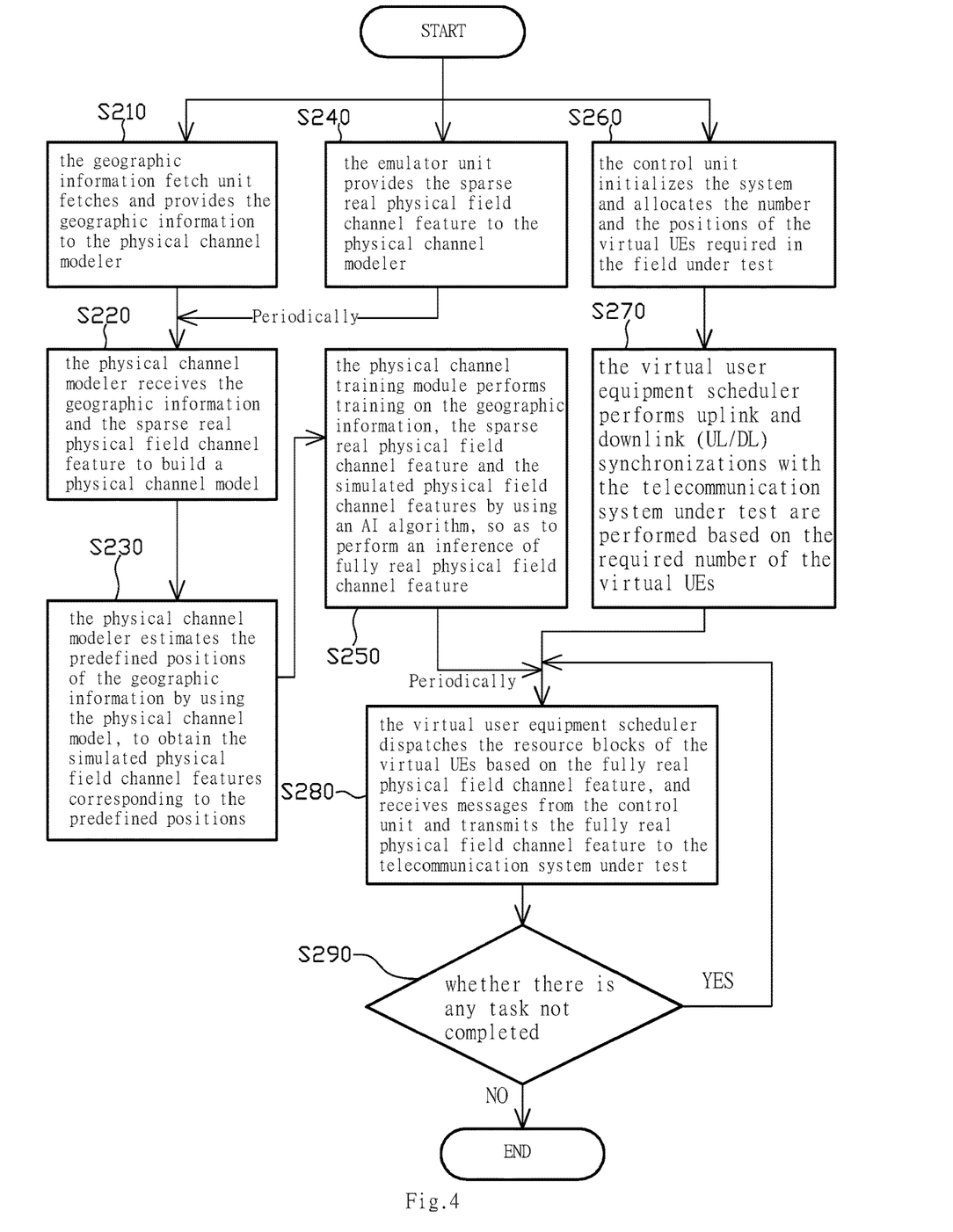
FIG. 4 is a flowchart of a method for synthesizing signal of user equipment, by applying the system of FIG. 3.

FIG. 4 is a flowchart of a method for synthesizing signal of user equipment, by applying the system of FIG. 1. Please refer to FIGS. 1, 3 and 4. First of all, in a step S210, the geographic information fetch unit 130 fetches the geographic information G, and provides the geographic information G to the physical channel modeler 110; a S240 can be performed at the same time as the steps S210; that is, the emulator unit 140 provides the sparse real physical field channel feature S to the physical channel modeler 110 in the step S240. In this embodiment, the step S240 can be performed periodically, but the present invention is not limited thereto.

Next, in a step S220, the physical channel modeler 110 receives the geographic information G and the sparse real physical field channel feature S to build a physical channel model. Next, in a step S230, the physical channel modeler 110 estimates the plurality of predefined positions P2 of the geographic information G by using the physical channel model, to obtain the plurality of simulated physical field channel features D2 corresponding to the plurality of predefined positions P2.

Next, in a step S250, the physical channel training module 120 performs training on the geographic information G, the sparse real physical field channel feature S and the plurality of simulated physical field channel features D2 by using an artificial intelligence (AI) algorithm, so as to perform an inference of fully real physical field channel feature P. In this embodiment, the step S250 can be performed periodically, but the present invention is not limited thereto.

Furthermore, a step S260 can be performed at the same time as the step S240; in the step 260, the control unit 150 initializes the system and allocates the number and the positions of the plurality of virtual UEs (not shown in figures) required in the field under test. Next, in a step S270, the virtual user equipment scheduler 160 performs uplink and downlink (UL/DL) synchronizations with the telecommunication system under test (the base station 50) are performed based on the required number of the virtual UEs. Next, in a step S280, the virtual user equipment scheduler 160 dispatches the resource blocks of the plurality of virtual UEs based on the fully real physical field channel feature P, and receives messages from the control unit 150 and transmits the fully real physical field channel feature P, which is transmitted from the physical channel training module 120, to the telecommunication system under test (the base station 50). Next, in a step S290, it determines whether there is any task not completed, and if at least one task is not completed, the flow of the method returns to the step S280.

It is worth noting that the content of the CSI report reported from the virtual UEs to the base station 50 can be estimated by cooperation of the emulator unit 140, the geographic information fetch unit 130, the physical channel modeler 110 and the physical channel training module 120. For example, the content of the CSI report can be the fully real physical field channel feature P. Furthermore, the contents of the CSI reports of the virtual UEs can be compliant with the frame content of the 3GPP 38.214 by updating the reports in every training stage or periodically, and can be used to estimate or assign other correlative parameters, such as CQI, CRI, PMI, RI, LI, and the virtual UEs can be controlled by the control unit 150.

Besides, the control unit 150 also uses the emulator units 140 to perform uplink/downlink synchronization process defined in 3GPP 36.211 standard, and the process includes receiving PSCH signal to determine Cell ID, comparing SCCH data to implement time synchronization, checking PBCH, analyzing MIB and SIB, and performing sequential PCFICH, PDCCH, PDSCH, RACH synchronization and setting stages. In this way, the virtual user equipment scheduler 160 can accept to be arranged, by the control unit 150, to transmit the specified message content in the resource block compliant with the standard, based on the analyzed data. Eventually, the NAS layer can complete the establishment of the RRC interconnection and the sequential interconnection and the data transmission, to communicate to the telecommunication system under test (the base station 50).

Figure 5:
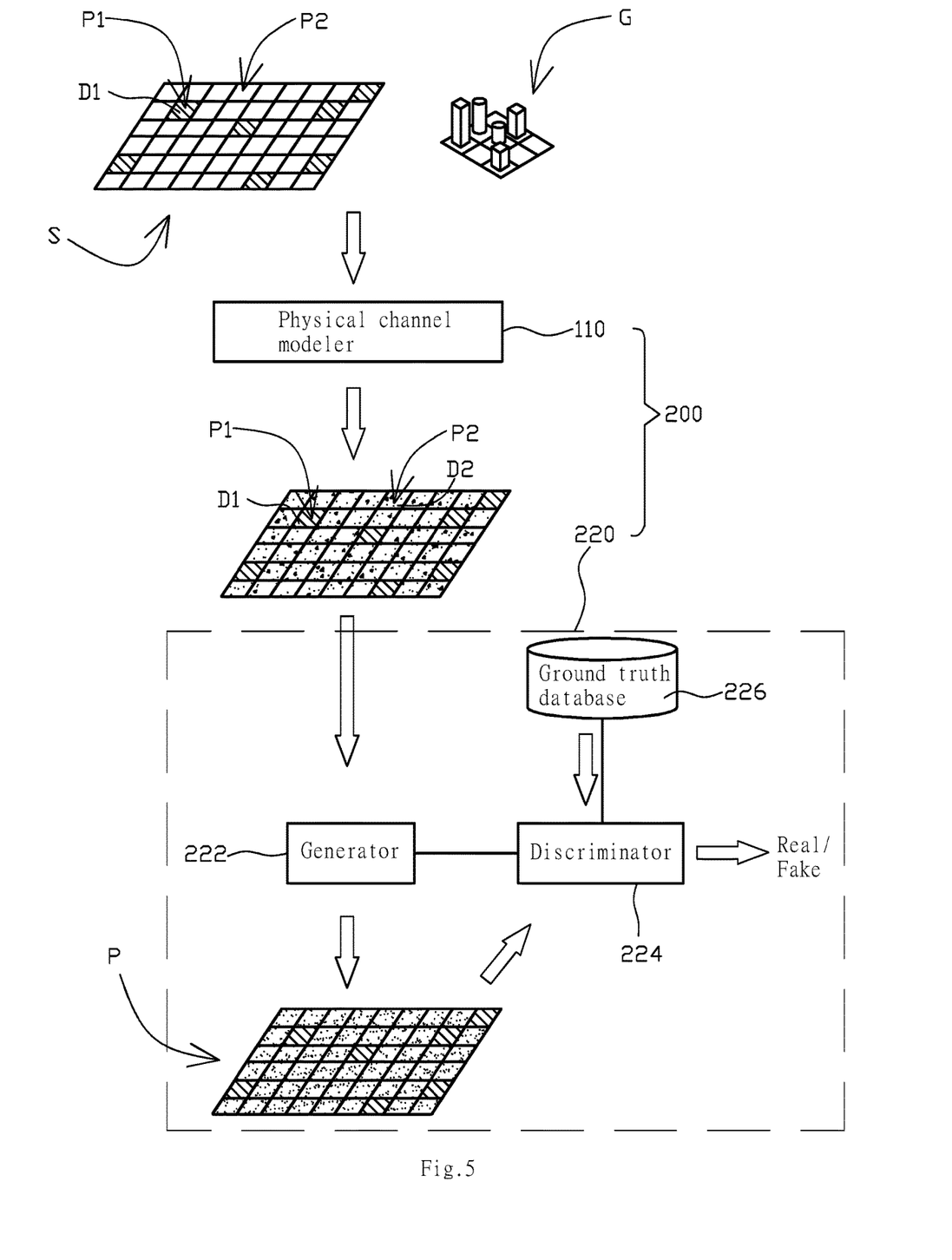
FIG. 5 is a schematic conceptual diagram of a system for synthesizing signal of user equipment, according to another embodiment of the present invention.

FIG. 5 is a schematic conceptual diagram of a system for synthesizing signal of user equipment, according to another embodiment of the present invention. Please refer to FIGS. 1 and 3. The systems 100 and 200 for synthesizing signal of user equipment are similar with each other, and the difference between the systems 100 and 200 for synthesizing signal of user equipment is that the physical channel training module 220 includes a generator 222, a discriminator 224 and a ground truth database 226. The generator 222 performs an inference of the fully real physical field channel feature P by using an artificial intelligence (AI) algorithm, and the discriminator 224 uses another artificial intelligence (AI) algorithm to judge reality of the fully real physical field channel feature P generated by the generator 222, and performs adversarial training on the generator 222 and the discriminator 224 until the Nash Equilibrium is achieved. The ground truth database 226 provides ground truth data to the discriminator 224 for training and judgement.

In this embodiment, the generative adversarial network (GAN) is taken as example for auxiliary illustration, and the AI architecture applied in the present invention can include, but not limited to, GAN network architecture. The work target of the generator 222 is to perform the inference of the fully real physical field channel feature P based on the sparse real physical field channel feature S. In order to assist the generator 222 to reach the target, and another AI algorithm can be used to perform training on the discriminator 224 to judge the reality of the fully real physical field channel feature generated by the generator 222. When the Nash Equilibrium is achieved during the adversarial training of the generator 222 and the discriminator 224, the generator 222 can have capability of generating high true fully real physical field channel feature, and it indicates that the AI-assisted simulation training process is completed.

It is worth noting that the generation of the ground truth dataset of ground truth database 226 can also be flexible. In this embodiment, the fully real physical field channel feature P or the simulated physical field channel feature D2 can be post-processed to obtain the data set as labels corresponding to the samples. In summary, the AI-assisted simulation model training belongs to a supervised learning, and the main purpose of this training is to train the generator 222 to simulate full samples based on the sparse and incomplete samples. The design purpose of the discriminator 224 is to provide a particular loss function, so as to guide the generator 222 to generate the fully real physical field channel feature P satisfying the actual condition.

In this embodiment, after the training process is completed, it just needs to provide and feed samples of new field into the physical channel training module, so that the physical channel training module can perform the inference of the fully real physical field channel feature and provide the channel feature parameter of the specified geographic location to other system devices. For example, the samples can include the sparse real physical field channel feature, the simulated physical field channel feature and the geographic information of the physical field geographic information. It is worth noting that the fully real physical field channel feature is not required in the test stage, the trained AI model can perform the interference of the measurement result based on the incomplete samples, so as to maximally reduce manpower and material resource for full sample measure, thereby achieving the design purpose of this embodiment.

In summary, the system and the method of the present invention uses AI algorithm to implement the physical channel training module and also bridges the two conventional technical methods; therefore, the present invention can use the sparse real physical field channel features measured by few emulator units and the simulated physical field channel features obtained by the channel model, to enable the physical channel training module to perform the inference of the fully real physical field channel feature, and the inference result is almost the same as the result really measured by a large amount of the emulator units. Furthermore, the user can use the method of the present invention to obtain the field channel feature measurement result in a very short time. With increasing of operating time and training times, the accuracy of the result can be improved continuously. Furthermore, after the virtual user equipment scheduler receives the field channel feature measurement result, the signal of the virtual UE can be generated and transmitted based on control of the upper-layer parameters by the control unit, the user equipment operation design, and scheduling of the resource blocks in time domain/frequency-domain by the virtual user equipment scheduler, so as to enable the telecommunication system under test to identify the virtual UE at the predefined geographic location based on the signals. In this way, the present invention can implement transmission of a signal of a virtual UE for each geographic location by using a fixed number of emulator units, so as to complete testing of the field under test.

What is claimed is:

1. A system for synthesizing signal of user equipment, comprising:
  a physical channel modeler configured to receive geographic information of a field under test and a sparse real physical field channel feature, to build a physical channel model and estimate a plurality of predefined positions of the geographic information by using the physical channel model, to obtain a plurality of simulated physical field channel features corresponding to the plurality of predefined positions, wherein the sparse real physical field channel feature comprises a plurality of real physical field channel features measured at a plurality of measure positions of the geographic information, respectively; and
  a physical channel training module connected to the physical channel modeler, and configured to receive the geographic information, the sparse real physical field channel feature and the simulated physical field channel feature, and perform training on the geographic information, the sparse real physical field channel feature and the simulated physical field channel feature by using an artificial intelligence algorithm, to perform an inference of fully real physical field channel feature covering the plurality of predefined positions and the plurality of measure positions.

2. The system according to claim 1, further comprising:
  a plurality of emulator units disposed at the plurality of measure positions in the field under test and connected to a telecommunication system under test, wherein the plurality of emulator units transmit signals to and receive signals from the telecommunication system under test, so as to provide the sparse real physical field channel feature to the physical channel modeler.

3. The system according to claim 1, further comprising:
  a geographic information fetch unit connected to the physical channel modeler and configured to fetch the geographic information and provide the geographic information to the physical channel modeler.

4. The system according to claim 3, wherein the geographic information fetch unit is a lidar configured to scan the field under test to obtain geographic information.

5. The system according to claim 3, further comprising:
a geographic database, wherein the geographic information fetch unit is linked to the geographic database to obtain the geographic information from the geographic database.

6. The system according to claim 1, further comprising:
a control unit connected to the physical channel modeler, the physical channel training module and the virtual user equipment scheduler, and configured to control at least one of operations of starting, ending and executing predefined processes or steps, and requesting report data, and allocate the number and positions of the plurality of virtual UEs required in the field under test; and
a virtual user equipment scheduler configured to assign or modify dispatch, schedule, management and information of the resource blocks of the plurality virtual UEs based on the fully real physical field channel feature.

7. The system according to claim 1, wherein the physical channel training module comprises:
a generator configured to perform an inference of the fully real physical field channel feature by using the artificial intelligence algorithm;
a discriminator configured to judge reality of the fully real physical field channel feature, which is generated by the generator, by using another artificial intelligence algorithm, and perform adversarial training on the generator and the discriminator until the Nash Equilibrium is achieved.

8. The system according to claim 1, wherein the artificial intelligence algorithm is a convolution-neural-network-based algorithm.

9. A method for synthesizing signal of user equipment, comprising:
receiving geographic information of a field under test and a sparse real physical field channel feature to build a physical channel model, wherein the sparse real physical field channel feature comprises a plurality of real physical field channel features measured at a plurality of measure positions of the geographic information, respectively;
estimating a plurality of predefined positions of the geographic information by using the physical channel model, to obtain a plurality of simulated physical field channel features corresponding to the plurality of predefined positions; and
receiving the geographic information, the sparse real physical field channel feature and the simulated physical field channel features, and performing training on the geographic information, the sparse real physical field channel feature and the simulated physical field channel features by using an artificial intelligence (AI) algorithm, to perform an inference of a fully real physical field channel feature covering the plurality of predefined positions and the plurality of measure positions.

10. The method according to claim 9, wherein the step of performing the inference of the fully real physical field channel feature comprises:
performing the inference of the fully real physical field channel feature by using the artificial intelligence (AI) algorithm; and
judging reality of the fully real physical field channel feature, which is generated by the generator, by using another artificial intelligence (AI) algorithm, and performing adversarial training on the generator and the discriminator until the Nash Equilibrium is achieved.

11. The method according to claim 9, further comprising:
allocating number and positions of the plurality of virtual UEs required in the field under test; and
assigning or modifying dispatch, schedule, management and information of resource blocks of the plurality of virtual UEs based on the fully real physical field channel feature.

\* \* \* \* \*